(12) United States Patent
Tseng

(10) Patent No.: US 6,927,799 B2
(45) Date of Patent: Aug. 9, 2005

(54) AUTO-STROBE APPARATUS AND METHOD FOR DIGITAL CAMERA

(75) Inventor: Li-Wen Tseng, FengShan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 672 days.

(21) Appl. No.: 10/101,593

(22) Filed: Mar. 21, 2002

(65) Prior Publication Data

US 2003/0179312 A1 Sep. 25, 2003

(51) Int. Cl.[7] .............................................. H04N 5/222
(52) U.S. Cl. ...................................................... 348/371
(58) Field of Search ................................ 348/370, 371, 348/223.1, 224.1, 225.1, 254, 362, 363, 364, 365, 366, 367, 368; 396/155, 159, 161, 164, 166, 168, 172, 269

(56) References Cited

U.S. PATENT DOCUMENTS

| | | | | |
|---|---|---|---|---|
| 5,438,367 A | * | 8/1995 | Yamamoto et al. | 348/371 |
| 5,682,562 A | * | 10/1997 | Mizukoshi et al. | 396/159 |
| 5,815,743 A | * | 9/1998 | Ohmori | 396/61 |
| 6,564,014 B1 | * | 5/2003 | Takeuchi et al. | 396/157 |

* cited by examiner

Primary Examiner—Wendy R. Garber
Assistant Examiner—Justin Misleh
(74) Attorney, Agent, or Firm—Bacon & Thomas PLLC

(57) ABSTRACT

An auto-strobe apparatus and an auto-strobe method for the digital camera are provided. There is provided a variable reference voltage signal being inversely proportional to a product of an analog gain, a digital gain, and a gamma value of the digital camera. When taking a picture and generating flash, the brightness is detected and, when a voltage signal representing the detected brightness is larger than the variable reference voltage signal, the flash is stopped.

5 Claims, 3 Drawing Sheets

AUTO-STROBE APPARATUS AND METHOD FOR DIGITAL CAMERA

BACKGROUND OF THE INVENTION

1. Field of the Invention

The present invention relates to an auto-strobe apparatus and an auto-strobe method for the digital camera and, more particularly, to an auto-strobe apparatus and an auto-strobe method capable of automatically adjusting the flashing brightness based on different gain settings.

2. Description of Related Art

In the conventional built-in flashing technique, a simple implementation is to make the strobe apparatus complete flash or not (i.e., full or null). Also, for avoiding an excessive amount of light from radiating from a flash lamp 11, as shown in FIG. 1, an additional photo detector 12 and a comparator 13 are provided in a strobe apparatus. Hence, the brightness sensed by the photo detector 12 is compared with a predetermined reference voltage signal Vref by the comparator 13, and the flash lamp 11 is disabled when the photo detector 12 senses an appropriate amount of brightness. This can obtain a maximum flashing effect of the strobe apparatus.

For precisely controlling the flash lamp 11, data about aperture, distance from an object to be captured by the camera, etc. is also taken into consideration for calculating an more accurate predetermined reference voltage signal Vref.

However, it is known that the gain setting is critical to the brightness and quality of image captured by a digital camera. The physical meaning of the gain setting is to amplify or reduce the amount of signal from an image sensor. When the photo detector of the strobe apparatus senses an appropriate amount of light and stops flashing the flash lamp, theoretically, the image sensor is well exposed. However, because the physical meaning of the gain setting is to amplify or reduce the amount of signal from an image sensor, this image signal is amplified by the gain device, and thus the actually captured image is over-light. Thus, it is desired for the above conventional strobe apparatus to be improved to mitigate and/or obviate the problems.

SUMMARY OF THE INVENTION

The object of the present invention is to provide an auto-strobe apparatus and an auto-strobe method for digital camera, which are capable of automatically adjusting the flashing brightness based on different gain settings so as to obtain the same flashing exposure effect no matter what the gain setting is.

In one aspect of the present invention, an auto-strobe apparatus for a digital camera is provided, which comprises: an image sensor for capturing external images; an image processing circuit including an auto-exposure control circuit, an auto-white balance circuit, and a gamma setting circuit for setting an analog gain value, a digital gain value, and a gamma value, respectively, based on a brightness of the image captured by the image sensor; a flash module including a flash lamp for providing light source while taking a picture, a photo detector for detecting brightness when the flash lamp flashes and converting the detected brightness into a brightness voltage signal, and a comparator for comparing the brightness voltage signal with a variable reference voltage signal, so as to stop flashing the flash lamp when the brightness voltage signal is larger than the variable reference voltage signal; and a comparison voltage generator for generating the variable reference voltage signal based on the analog gain, the digital gain, and the gamma value.

In another aspect of the present invention, there is provided an auto-strobe method for a digital camera, which comprises the steps of: (A) providing a variable reference voltage signal being inversely proportional to a product of an analog gain, a digital gain, and a gamma value of the digital camera; (B) flashing to take a picture; and (C) detecting brightness and, when a voltage signal representing the detected brightness is larger than the variable reference voltage signal, stopping flashing.

Other objects, advantages, and novel features of the invention will become more apparent from the detailed description when taken in conjunction with the accompanying drawings.

DETAILED DESCRIPTION OF THE PREFERRED EMBODIMENT

Figure 1:
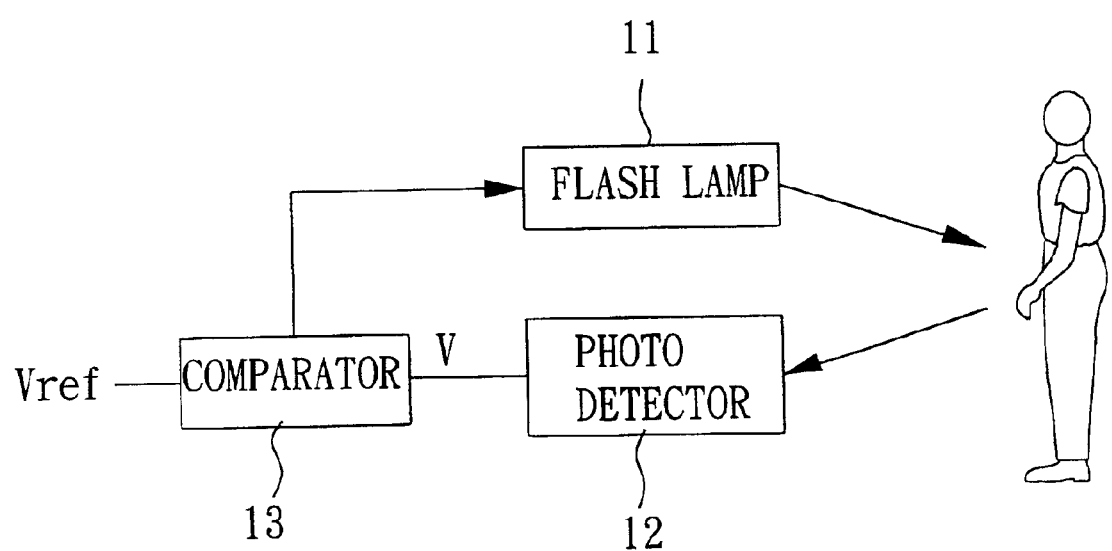
FIG. 1 is a block diagram of a conventional strobe apparatus for a camera.
Figure 2:
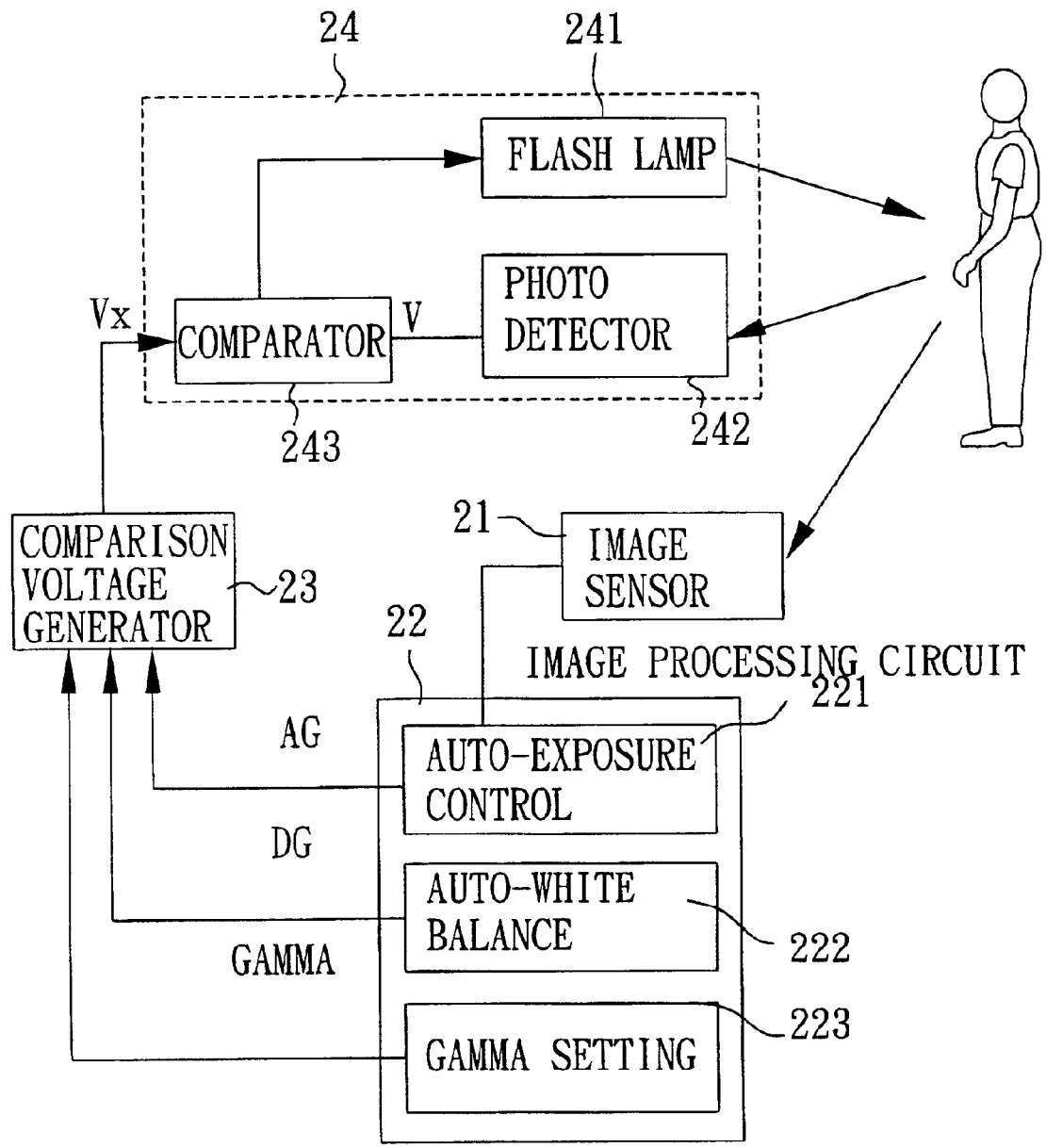
FIG. 2 is a block diagram of an auto-strobe apparatus for a digital camera according to the present invention.

With reference to FIG. 2, there is shown a auto-strobe apparatus for digital camera in accordance with the present invention, which includes an image sensor 21, an image processing circuit 22, a comparison voltage generator 23, and a flash module 24. The image sensor 21 is, for example, a CCD device (charge coupled device) for sensing external images. The flash module 24 includes a flash lamp 241, a photo detector 242, and a comparator 243. The flash lamp 241 is provided as a light source while taking a picture. The photo detector 242 is provided for detecting brightness when the flash lamp 241 flashes and converting the detected brightness into a brightness voltage signal V. The comparator 243 compares the brightness voltage signal V with a variable reference voltage signal Vx, so as to stop flashing the flash lamp 241 when the brightness voltage signal V is larger than the variable reference voltage signal Vx.

The image processing circuit 22 is provided to set parameters related to image fetching, and process the image sensed by the image sensor 21. The image processing circuit 22 includes an auto-exposure control circuit 221, an auto-white balance circuit 222, and a gamma setting circuit 223. The auto-exposure control circuit 221 can set an analog gain value based on the brightness of the image sensed by the image sensor 21. The auto-white balance circuit 222 can set a digital gain value based on the brightness of the image sensed by the image sensor 21. The gamma setting circuit 223 can set a gamma value based on the brightness of the image sensed by the image sensor 21.

The above analog gain value, digital gain value, and gamma value are used to determine various gains of the digital camera including the analog gain, the digital gain, and the gamma adjustment. The analog gain refers to an amplification of the analog signal which is generated by the image sensor 21 and processed by a CDS (correlated double sampling). Therefore, the same image captured by the image sensor 21 may exhibit different brightness if the setting of analog gains is different. The digital gain refers to performing various settings on the digital signal obtained from converting the amplified analog signal. Therefore, the brightness of image is different if the setting of digital gain is changed. The gamma adjustment is used to re-adjust the brightness of each pixel of the image. Hence, the brightness of the image is different if the gamma setting is different.

From the above analysis, it is known that the brightness of the image will be affected by the analog gain, the digital gain, and the gamma setting of digital camera. For obtaining the same flashing exposure effect in different gain settings, it is required to dynamically adjust the illuminating time of the flash lamp 241 based on the gain setting. In the case of analog gain, if the analog gain is g and the brightness of the image sensed by the image sensor 21 is y, the mathematical model for obtaining the desired same flashing exposure effect is: g×y=k, where k is a constant.

The brightness of the image sensed by the image sensor 21 can be represented by brightness voltage signal V generated by photo detector 242 of the flash module 24. Furthermore, the analog gain, the digital gain, and the gamma setting are determined before the flash lamp 241 turns on to flash. Therefore, the comparison voltage generator 23 can dynamically adjust the variable reference voltage signal Vx based on the analog gain, the digital gain, and the gamma value set by the image processing circuit 22. In other words, the variable reference voltage signal Vx is varied as the analog gain, the digital gain, and the gamma value. Accordingly, when the flash module 24 flashes in taking a picture, the brightness voltage signal V generated by the photo detector 242 is transmitted to the comparator 243 for being compared with the variable reference voltage signal Vx predetermined by the analog gain, the digital gain, and the gamma value. When V>Vx, the power supply to the flash lamp 241 is inhibited to stop flashing. As such, it is possible of obtaining the same flashing exposure effect no matter what the gain setting is.

Figure 3:
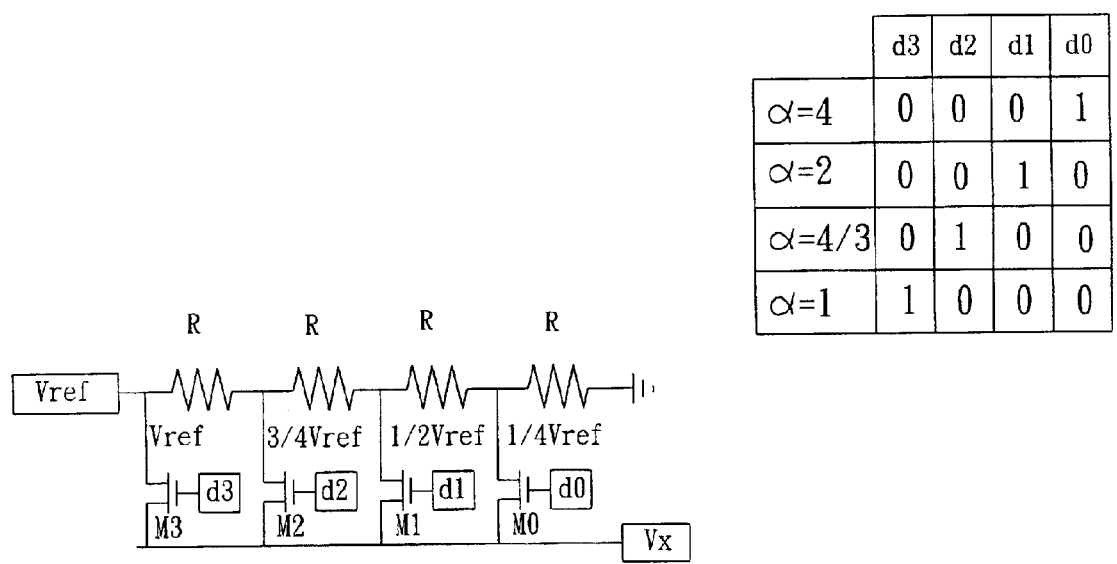
FIG. 3 is a circuit diagram of a comparison voltage generator of the auto-strobe apparatus for a digital camera according to the present invention.

The comparison voltage generator 23 acts to determine the variable reference voltage signal Vx from the analog gain, the digital gain, and the gamma value by calculation or referring to a table. Furthermore, the variable reference voltage signal Vx is inversely proportional to the product of the analog gain, digital gain, and gamma value. Preferably, the variable reference voltage signal Vx is equal to a reference voltage Vref divided by the product of analog gain, digital gain, and gamma value. FIG. 3 shows a preferred embodiment of the comparison voltage generator 23, which comprises four resistors R serially connected to a reference voltage Vref to provide the divided voltages including Vref, ¾ Vref, ½ Vref, and ¼ Vref, and four switch transistors M0, M1, M2, and M3 which are selectively turned on to select one of the divided voltages Vref, ¾ Vref, ½ Vref, and ¼ Vref for being used as the variable reference voltage signal Vx. The switch control signals d0, d1, d2, and d3 of the switch transistors M0, M1, M2, and M3 is obtained by looking up a table. As shown, when the products of the analog gain, digital gain, and gamma value are 4, 2, 4/3, and 1, the signals d0, d1, d2, and d3 are all 1, so as to respectively turn on the switch transistors M0, M1, M2, and M3. As a result, the generated variable reference voltage signals Vx are ¼ Vref, ½ Vref, ¾ Vref, and Vref, respectively.

Although the present invention has been explained in relation to its preferred embodiment, it is to be understood that many other possible modifications and variations can be made without departing from the spirit and scope of the invention as hereinafter claimed.

What is claimed is:

1. An auto-strobe apparatus for a digital camera, comprising:

an image sensor for capturing external images;

an image processing circuit including an auto-exposure control circuit, an auto-white balance circuit, and a gamma setting circuit for setting an analog gain value, a digital gain value, and a gamma value, respectively, based on a brightness of the image captured by the image sensor;

a flash module including a flash lamp for providing light source while taking a picture, a photo detector for detecting brightness when the flash lamp flashes and converting the detected brightness into a brightness voltage signal, and a comparator for comparing the brightness voltage signal with a variable reference voltage signal, so as to stop flashing the flash lamp when the brightness voltage signal is larger than the variable reference voltage signal; and a comparison voltage generator for generating the variable reference voltage signal based on the analog gain, the digital gain, and the gamma value.

2. The auto-strobe apparatus as claimed in claim 1, wherein the variable reference voltage signal generated by the comparison voltage generator is inversely proportional to a product of the analog gain, the digital gain, and the gamma value.

3. The auto-strobe apparatus as claimed in claim 2, wherein the variable reference voltage signal generated by the comparison voltage generator is equal to a reference voltage divided by the product of the analog increment, the digital increment, and the gamma value.

4. An auto-strobe method for a digital camera, comprising the steps of:

(A) providing a variable reference voltage signal being inversely proportional to a product of an analog gain, a digital gain, and a gamma value of the digital camera;

(B) flashing to take a picture; and (C) detecting brightness and, when a voltage signal representing the detected brightness is larger than the variable reference voltage signal, stopping flashing.

5. The auto-strobe method as claimed in claim 4, wherein in step (A) the variable reference voltage signal is equal to a reference voltage divided by the product of the analog gain, the digital gain, and the gamma value.

* * * * *